United States Patent
Rohrer et al.

(10) Patent No.: US 8,230,142 B1
(45) Date of Patent: Jul. 24, 2012

(54) METHOD AND APPARATUS FOR PROVIDING EGRESS DATA IN AN EMBEDDED SYSTEM

(75) Inventors: Carl F. Rohrer, Longmont, CO (US); Stacey Secatch, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 449 days.

(21) Appl. No.: 12/122,212

(22) Filed: May 16, 2008

(51) Int. Cl.
*G06F 3/00* (2006.01)
(52) U.S. Cl. .......................................... 710/55
(58) Field of Classification Search ....................... 710/55
See application file for complete search history.

(56) References Cited

U.S. PATENT DOCUMENTS

| | | | | |
|---|---|---|---|---|
| 4,959,771 A | * | 9/1990 | Ardini et al. | 711/136 |
| 6,094,686 A | * | 7/2000 | Sharma | 709/240 |
| 6,892,290 B2 | * | 5/2005 | Van Doren | 711/168 |
| 7,200,144 B2 | * | 4/2007 | Terrell et al. | 370/389 |
| 2004/0121748 A1 | * | 6/2004 | Glaza | 455/151.1 |

* cited by examiner

*Primary Examiner* — Henry Tsai
*Assistant Examiner* — Juanito Borromeo
(74) *Attorney, Agent, or Firm* — Kin-Wah Tong; Thomas George

(57) ABSTRACT

In one embodiment, a device is disclosed. For example, in one embodiment of the present invention, the device comprises a memory core having a shared buffer, and an arbitration logic module for receiving a destination ready signal from a processing source of a plurality of processing sources. The device also comprises at least one pipeline stage for storing at least one piece of data read from the shared buffer, and at least one matching pipeline stage storing at least one valid signal associated with the at least one piece of data read from the shared buffer. The device also comprises a counter for storing a value, wherein the value represents a number of pieces of data read from the shared buffer, but have not been delivered to the processing source.

18 Claims, 4 Drawing Sheets

METHOD AND APPARATUS FOR PROVIDING EGRESS DATA IN AN EMBEDDED SYSTEM

FIELD OF THE INVENTION

One or more aspects of the present invention relate generally to the use of a logic module for supporting future read accesses in an embedded system.

BACKGROUND OF THE INVENTION

Various networking protocols allow a plurality of network devices to communicate over a network, e.g., a ring network. For example, Media Oriented Systems Transport (MOST) is an automotive infotainment protocol where bytes of synchronous data such as audio and video are transported in time-divisioned multiplexed frames around a ring network. The protocol is specified up to the application layer, which implies a compliant network services stack running in software. Thus, a Network Interface Controller (NIC) will allow compliancy at the application level while providing connectivity at the physical layer, e.g., an optical ring.

Generally, within each network device, an interface, e.g., a shared bus, is employed to allow communications between various embedded cores, e.g., co-processors. For example, an embedded core may be tasked with an encryption function, a decryption function and the like. Furthermore, movement of data to and from such embedded cores to a centralized memory core is further complicated by contention for access to the centralized memory core. Access to the shared centralized memory core is one parameter that impacts the performance of the overall network device.

SUMMARY OF THE INVENTION

In one embodiment, a device is disclosed. For example, in one embodiment of the present invention, the device comprises a memory core having a shared buffer, and an arbitration logic module for receiving a destination ready signal from a processing source of a plurality of processing sources. The device also comprises at least one pipeline stage for storing at least one piece of data read from the shared buffer, and at least one matching pipeline stage storing at least one valid signal associated with the at least one piece of data read from the shared buffer. The device also comprises a counter for storing a value, wherein the value represents a number of pieces of data read from the shared buffer, but have not been delivered to the processing source.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION

Figure 1:
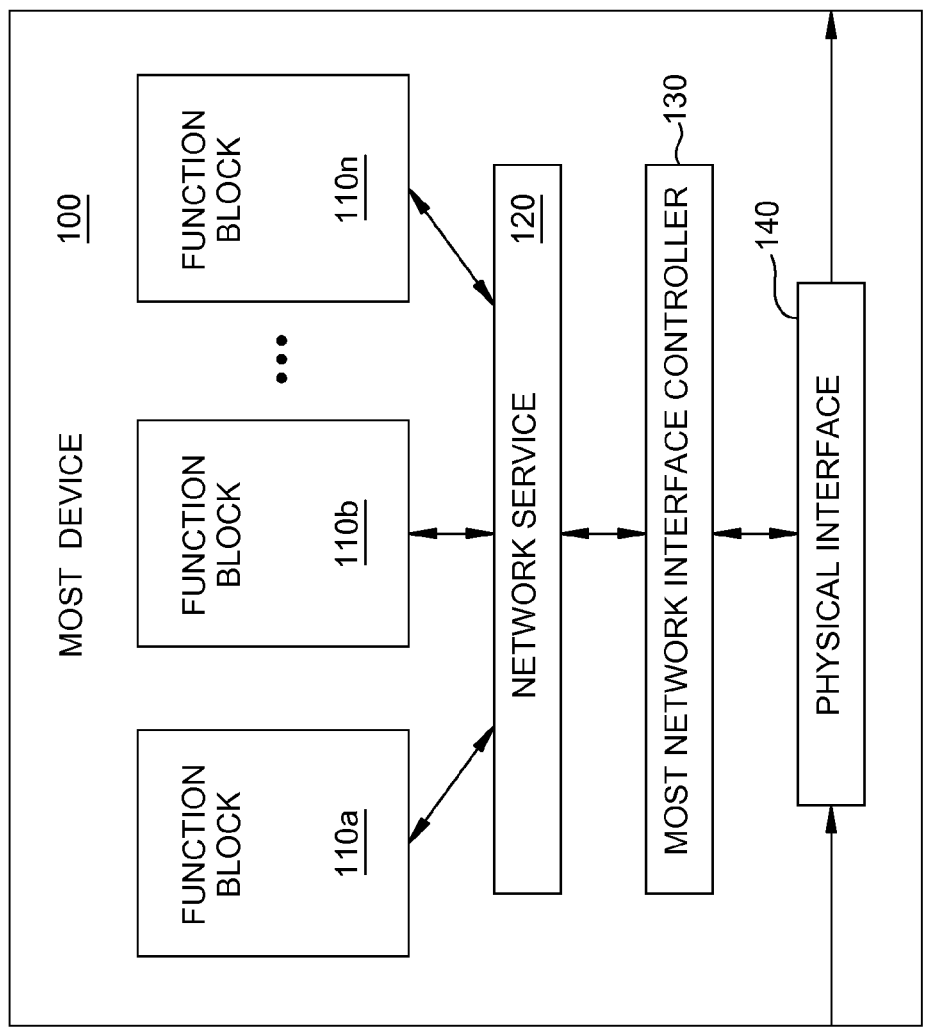
FIG. 1 illustrates an illustrative overview of a network device, e.g., a Media Oriented Systems Transport device.

FIG. 1 illustrates an illustrative overview of a network device 100, e.g., a Media Oriented Systems Transport (MOST) device. It should be noted that although the present invention is illustratively described in the context of a MOST device, the present invention is not so limited. Broadly, the present invention can be adapted to any device that employs a unified buffer (e.g., a shared memory) that supports a plurality of processing sources, e.g., processors, co-processors, controllers, and the like, that request data from the unified buffer.

In one illustrative embodiment, the network device 100 at the application level may comprise one or more components called function blocks 110a-n. For example, the function blocks may comprise, a tuner, an amplifier, a CD player, a DVD player and the like. Each network device 100 may comprise one or more function blocks, e.g., one network device may implement a tuner and an amplifier, whereas another network device may implement a DVD player. In one embodiment, the function blocks broadly represent applications.

The network device 100 may also include a network service component 120 which forms an intermediate layer providing one or more routines or interfaces for assisting the interactions between the function blocks and the Network Interface Controller (NIC) 130. The Network Interface Controller 130 facilitates the connection of the network device 100 to a network, e.g., a MOST network, via a physical interface 140. In one embodiment, the physical layer of the network comprises a ring network. However, it should be noted that the present invention is not limited to a ring network and that the present invention can be adapted to other types of physical networks.

In one embodiment, various applications within the network device 100 may need to access data and communicate with applications within the network device 100 and/or with other applications within another network device 100. For example, a memory core having one or more buffers (shown in FIG. 2 below) within the network device 100 may contain data that can be accessed by one or more applications. In one embodiment of the present invention, access to the memory core by one or more applications can be implemented via one or more direct links instead of using a shared bus.

Figure 2:
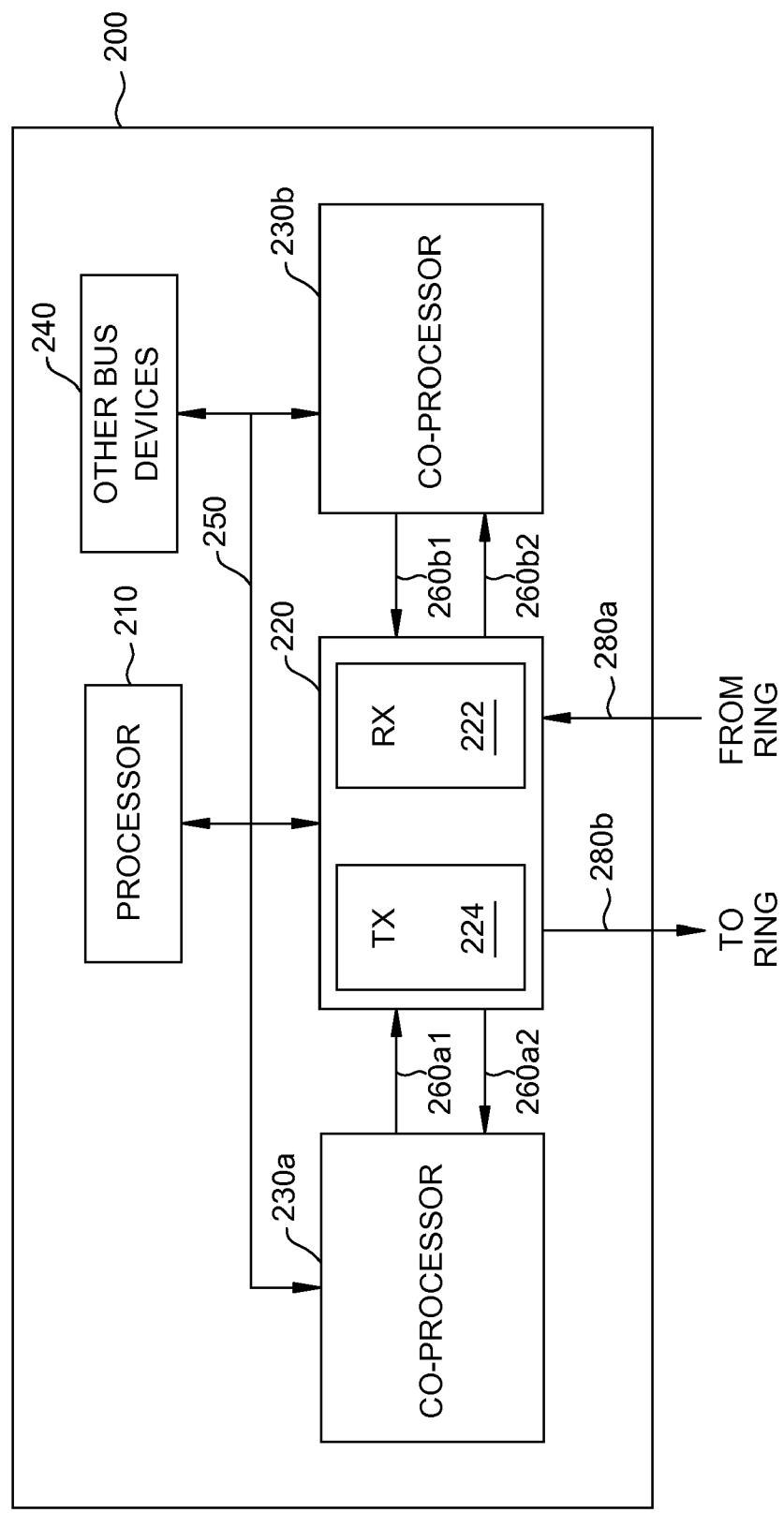
FIG. 2 illustrates an illustrative overview of a network device having a memory core of the present invention.

FIG. 2 illustrates an illustrative overview of a network device 200 (e.g., a MOST device) having a memory core 220 of the present invention. In one embodiment, network device 200 comprises a processor 210, e.g., an embedded processor, a memory core 220 having one or more buffers 222, 224, one or more co-processors 230a-b, and one or more other bus devices 240. In operation, the processor 210 serves to support various network services and various user applications. In supporting various network services and various user applications, the processor 210 may interact with one or more bus devices 240, e.g., speakers, displays, and the like. In one embodiment, the communication is carried via a shared bus 250. For example, the processor 210 may be tasked with processing audio data and video data, e.g., from a DVD player, to produce the proper audio outputs to a speaker and the proper video output to a display.

However, processing audio and video data can be computationally intensive. For example, the audio and video data from a DVD source can be encoded and/or encrypted, thereby requiring the processor to perform a decoding and/or decryption function. In fact, there may be numerous other audio processing functions and image processing functions that may be required, e.g., changing an image resolution, transcoding the audio and/or video data, format conversion, audio filtering and the like.

Given the complexity of these computationally intensive functions, one or more processing sources, e.g., co-processors 230a-b can be employed to assist the processor 210. It should be noted that although only one processor and two co-processors are illustrated, any number of processing sources (e.g., processors, co-processors, and controllers) can be employed in the present invention. It should be noted that each processing source may perform at least one of: an encryption function, a decryption function, an encoding function, a decoding function, a transcoding function, a format conversion function, a filtering function, a masking function, a compression function, a decompression function, a noise-cancellation function, or an equalization function.

In one embodiment, data necessary to support the various network services and various user applications are stored in a memory core 220 having one or more buffers 222 and 224. For example, the memory core 220 may employ a receive buffer 222 and a transmit buffer 224. Broadly, the receive buffer 222 is used to store data received by the network device 200, whereas the transmit buffer 224 is used to store data to be transmitted from the network device 200.

In one embodiment, data stored in the memory core 220 can be accessed by the processor 210, the co-processors 230a-b, and the other bus devices 240. In one embodiment, the processor 210, the co-processors 230a-b, and the other bus devices 240 must access the data stored in the memory core 220 via the bus 250. In an alternative embodiment, the co-processors 230a-b may access the data stored in the memory core 220 via direct access links 260a1-a2-260b1-b2. This alternate approach provides an improvement in allowing the co-processors to quickly and directly access the stored data without the assistance of the processor 210. Namely, the co-processors 230a-b do not need to send data requests to be serviced by the processor 210 or a DMA module. Similarly, in the alternate approach the co-processors 230a-b do not need to gain access to the shared bus 250 in accessing the stored data in the memory core 220.

To illustrate, if encrypted video data arrives on path 280a (broadly a network interface) and is stored in the receive buffer 222, then the co-processor 230b that is tasked with performing the decryption function may access the stored encrypted video data directly via the direct access link 260b2. When the encrypted video data is decrypted by the co-processor 230b, the decrypted video data is again returned to the receive buffer 222 directly via the direct access link 260b1. This ability to access the needed data without the assistance of the processor 210 and the use of the shared bus 250 significantly improves the speed with which the network device 200 is able to process data that is shared among the network devices within the network. For example, the network device 200 is able to better process data associated with real-time applications.

In one embodiment, the co-processor port may use an interface methodology that employs the use of control signals such as "source ready" and "destination ready" signals for accessing the shared memory core 220. For example, in the context of a read operation, the co-processor generates a destination ready signal to the shared memory core to inform the shared memory core that is currently ready to receive data. In turn, once the shared memory has accessed and retrieved the requested data from the proper memory location, it will send the source ready signal indicating the shared memory core has provided valid data on the interface to the co-processor.

However, in certain applications, there may be no forward-looking signal or count sizes. In other words, a co-processor may simply indicate that it is currently ready to receive data starting from a particular memory location, but the co-processor does not indicate the length of time that it will remain in a ready state to receive data, or the exact number of memory locations that data should be retrieved from. The co-processor may simply indicate that it is now ready to receive data and then summarily indicates that it is no longer ready to receive data.

Responsive to the destination ready signal, an egress port of the shared memory core should be capable of bursting data on every cycle that data is available for transmission and as long as the co-processor is still in a state capable of receiving the data. Although this bursting capability will improve memory access performance, the memory core must be cognizant of timing issues. One issue is that the shared memory core is serving a plurality of different processing sources or different accessing points. More specifically, it is possible that as data is continuously read from the shared memory core for a first processing source, then suddenly the first processing source is no longer ready to accept the requested data, e.g., the first processing source is now busy performing another function or an arbitration or conflict logic indicates that a second processing source should now be serviced instead of the first processing source. Under this illustrative scenario, data read from the shared memory core for the first processing source may have been read from the memory location, but it has yet to be delivered to the first requesting source. In other words, the latency (the time from the data being read from the shared buffer to the time the data actual exits the core memory) may cause data to be trapped between the shared buffer and the co-processor (i.e., data having been read from the shared buffer but is no longer able to be delivered to the co-processor).

One possible solution is to store the data in a separate buffer dedicated to the first requesting source so that it can be delivered to the first processing source once it returns to a state that it can receive data. However, this approach is costly and not scalable. For example, providing a plurality of dedicated buffers for all the processing sources is expensive and new processing sources may be added into the overall system in the future.

Figure 3:
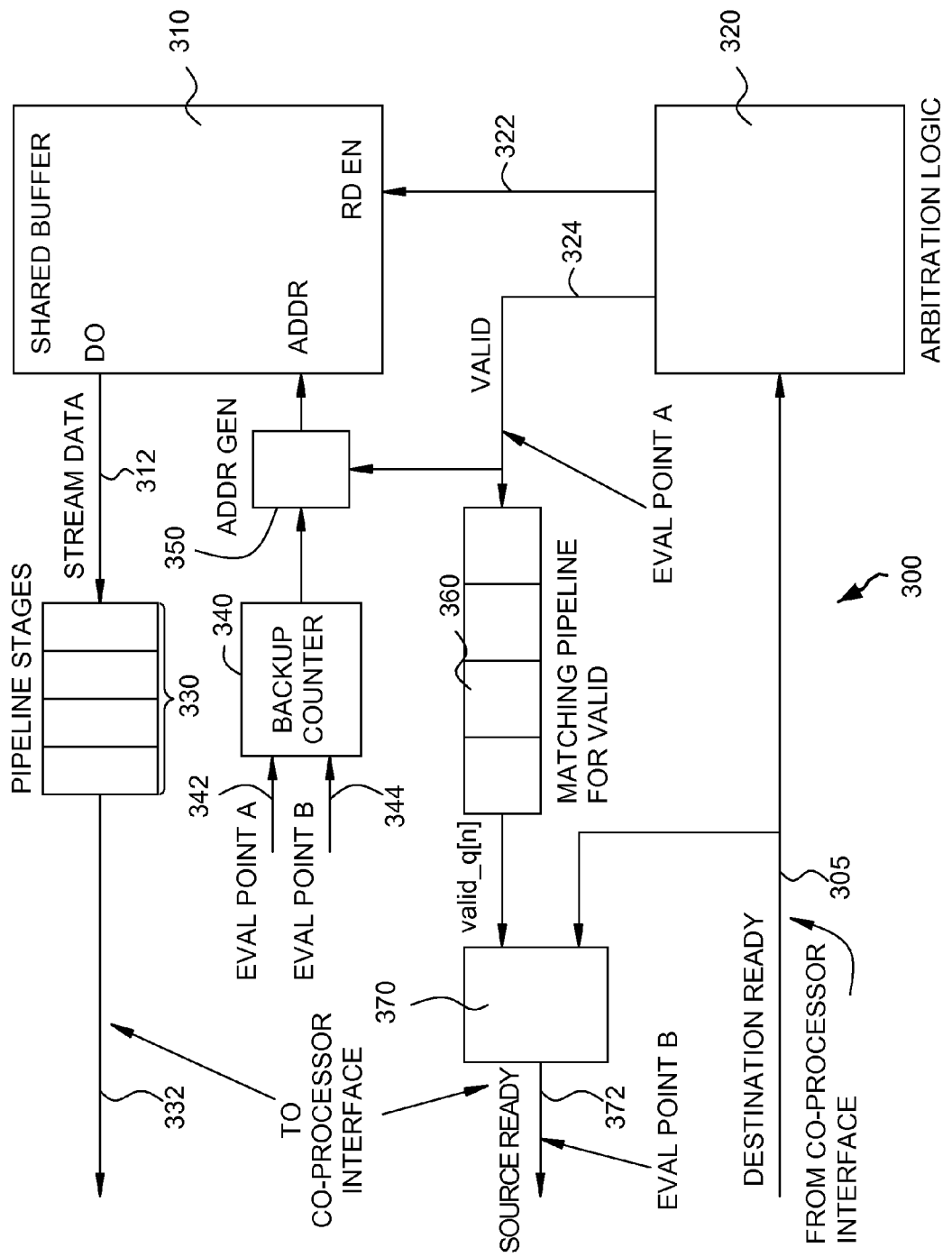
FIG. 3 illustrates an illustrative overview of a logic module that supports future read accesses or speculative read accesses in accordance with one embodiment of the present invention.

To address this criticality, the present invention provides a logic module for supporting future read accesses in an embedded system. FIG. 3 illustrates a logic module 300 that supports future read accesses or speculative read accesses. In one embodiment, the logic module 300 for supporting future read accesses comprises one or more pipeline stages 330, a backup counter 340 and one or more matching pipeline stages 360. In operation, a processing source, e.g., a co-processor, is requesting a read operation to be performed on the shared buffer 310. For example, the shared buffer 310 can be the receive buffer 222 or the transmit buffer 224 as illustrated in FIG. 2. Although FIG. 3 only illustrates a single co-processor interacting with the shared buffer 310 for simplicity, the present invention is not so limited. Namely, the shared buffer 310 is supporting a plurality of processing sources (e.g., processors, co-processors, controllers, and the like) that are not shown in FIG. 3.

In operation, a destination ready signal is received on interface 305. In one embodiment, the destination ready signal is from a co-processor, e.g., co-processor 230a or co-processor 230b as illustrated in FIG. 2. The destination ready signal indicates that the co-processor is ready to receive data read from the shared buffer 310. In one embodiment, the co-processor may simply indicate that it is currently ready to receive data starting from a particular memory location, but the co-processor does not indicate the length of time that it will remain in a ready state to receive data, or the exact number of memory locations that data should be retrieved from.

The destination ready signal is received into an arbitration logic module 320, which is tasked with the function of arbitrating between a plurality of competing requests to access the shared buffer. Arbitration logic is well known in the art and the present invention is not limited to a particular arbitration logic design. As discussed before, a plurality of processing resources is sharing the shared buffer 310. If the arbitration logic determines that the co-processor should be allowed to access the shared buffer 310, a read enable control signal is provided on interface 322. A valid signal is also generated in conjunction with the read enable control signal on interface 324. The valid signal is provided and stored in the matching pipeline stages 360. The valid signal is also provided to the address generator 350 so that the proper memory address is generated so that the corresponding data is read from the shared buffer 310, where the read data is provided on interface 312. In one embodiment, the read data is forwarded to a plurality of pipeline stages 330, which comprises a plurality of registers, e.g., 1-n shift registers. The number of registers in the pipeline stages 330 can be tailored to the requirements of a particular implementation. It should be noted that the number of pipeline stages 330 matches the number of stages in the matching pipeline 360.

In one embodiment, valid signals are continuously generated, thereby causing data to be read from the shared buffer 310 and passed to the pipeline stages. When data is ready to leave the core memory, e.g., exiting the last pipeline stage, to be sent to the co-processor, the corresponding valid signal in matching pipeline 360 is forwarded to the source ready signal generator 370. If the source ready signal generator 370 determines that the destination ready signal is still being asserted, then the source ready signal generator 370 will generate a source ready signal on interface 372 indicating that the core memory will send the requested data, i.e., where the data stored in the pipeline stages corresponding to the current valid signal received by the source ready signal generator 370 is sent to the co-processor.

However, since the co-processor's destination ready signal can be summarily de-asserted on interface 305, it is possible that data read from the shared buffer 310 may have not been delivered, i.e., the data has not exited the core memory. In other words, the read data is still residing in the pipeline stages, but the co-processor is no longer able to accept any more data at the present time. To address this criticality, a counter, e.g., a backup counter 340 is employed to readjust the address pointer.

In one embodiment, the counter 340 is able to track the number or pieces of data that have been read from the shared buffer 310 but have not been delivered to the requesting processing source. The counter 340 will provide this information to the address generator to readjust the address pointer. More specifically, in one embodiment, the counter operates as follows:
 a) If one piece of data exits the shared buffer, but one piece of data does not exit the overall memory core, then the counter increments.
 b) If one piece of data exits the overall memory core, but one piece of data does not exit the shared buffer, then the counter decrements.
 c) If one piece of data exits the overall memory core, and one piece of data exits the shared buffer, then the counter remains the same.
 d) if no data moves from the memory core and the shared buffer, then the counter remain the same.

In one embodiment, the input to the counter 340 indicating that a piece of data has exited the shared buffer is determined from the valid signal on interface 324 (illustrated as Eval point A 342). Similarly, the input to the counter 340 indicating that a piece of data has exited the overall core memory is determined from the source ready signal on interface 372 (illustrated as Eval point B 344).

Using the logic module 300 of the present invention, if the destination ready signal is summarily de-asserted, the logic module 300 may adjust the shared buffer address by the value stored in the counter 340. To illustrate, if the current buffer address is 15 and the counter 340 has a value of 4 and the destination ready signal is suddenly de-asserted, then the current buffer address will be adjusted by a value of 4 to be 11 instead of 15, thereby ensuring the data stored in address locations 11-14 will not be overwritten. In other words, data associated with address locations 11-14 have been previously read from the shared buffer 310 and were residing in the pipeline stages 330, but they have not been delivered to the co-processor before the destination ready signal was suddenly de-asserted. To ensure that the data stored in address locations 11-14 will not be lost, the read shared buffer address must be readjusted. In one embodiment, if the read shared buffer address is readjusted, then the corresponding data in the pipeline stages 330, the valid signals in the matching pipeline 360, and the counter value will be cleared or reset.

Figure 4:
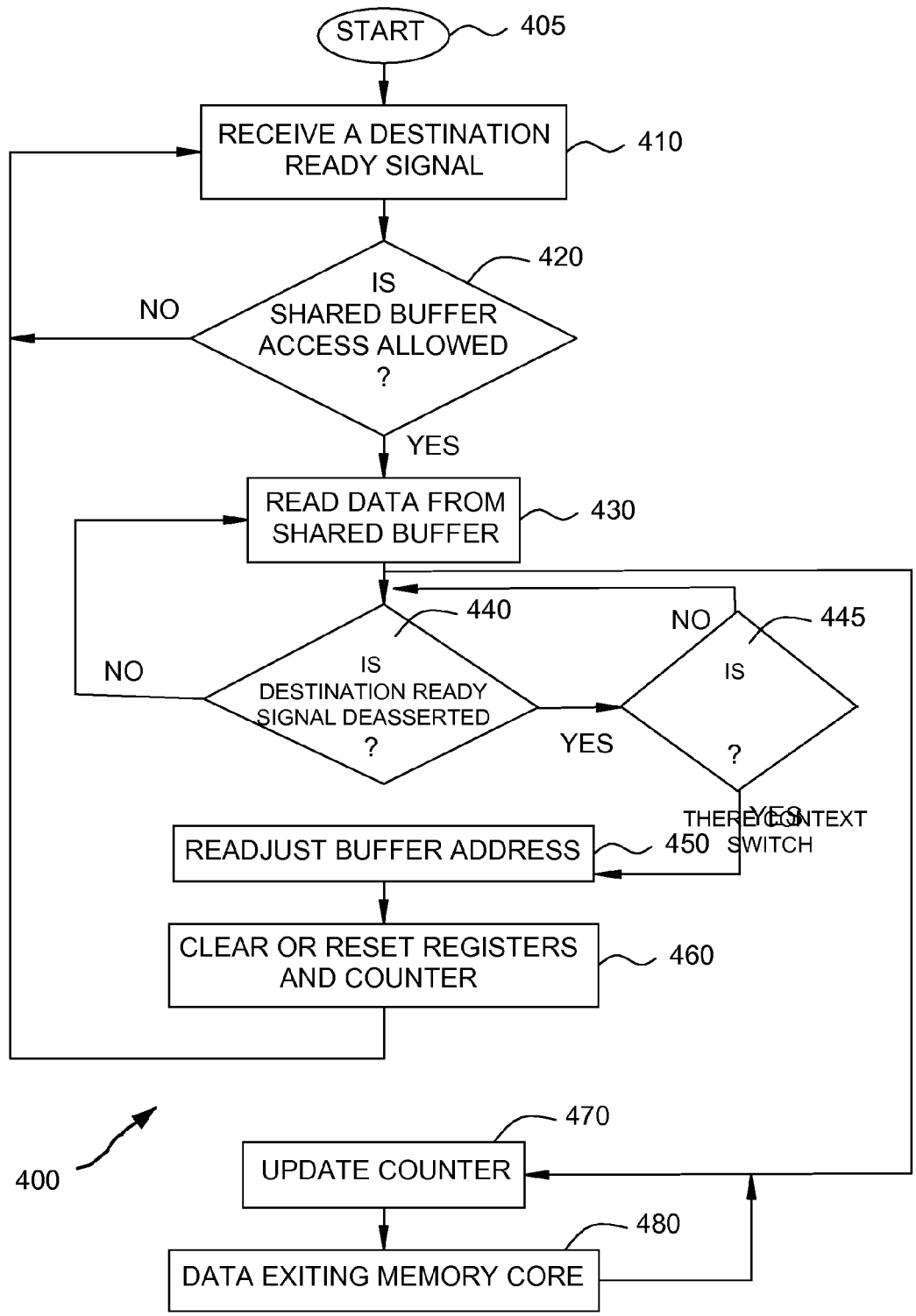
FIG. 4 illustrates a flow chart of a method for providing speculative read accesses in accordance with one or more embodiments of the present invention.

FIG. 4 illustrates a flow chart of a method 400 for providing speculative read accesses in accordance with one or more embodiments of the present invention. For example, method 400 can be performed by logic module 300 of FIG. 3.

Method 400 starts in step 405 and proceeds to step 410. In step 410, method 400 receives a destination ready signal from a processing source of a plurality of processing sources. For example, the processing source may be a co-processor, a processor, or a controller. The destination ready signal indicates that the processing source is ready to receive data read from a shared buffer starting at a particular address.

In step 420, method 400 determines whether the processing source is allowed to access the shared buffer. Since the shared buffer supports a plurality of processing sources, method 400 must determine whether the shared buffer is available to service the read request of the processing source. If the query is negatively answered, then method 400 returns to step 410 to wait for the next destination ready signal. If the query is positively answered, then method 400 proceeds to step 430.

In step 430, method 400 begins to start reading the data from the shared buffer.

In step 440, method 400 determines whether the destination signal has been de-asserted, thereby indicating that the processing source is no longer ready to receive any data from the shared buffer. If the query is answered negatively, method 400 returns to step 430. If the query is answered positively, method 400 proceeds to step 455.

In step 445, method 400 determines whether there is a context switch. For example, a context switch may comprise a change in a logical channel. For example, a co-processor may need to process data for a channel 0 instead of channel 1. Under such scenario, the co-processor will de-assert the destination ready signal and a context switch will be detected. In other words, the data associated with channel 1 is no longer needed by the co-processor. Thus, if the query is positively answered, then method 400 will proceed to step 450. However, if the query is negatively answered, then method 400 will proceed to step 440. In other words, the co-processor may de-assert the destination ready signal that is not related to a context switch, e.g., the co-processor is currently busy processing the received data. Once the co-processor is freed up, it will again assert the destination ready signal, and the data previously stored in the pipeline stages can be forwarded to the co-processor. In other words, detecting a de-assertion of the destination ready signal does not always cause the clearing of the pipeline stages and the counter.

It should be noted that after each data read as performed in step 430, method 400 also updates a counter in step 470. In other words, each instance (e.g., for each memory address location) where a piece of data is read from the shared buffer, the buffer will be updated (e.g., increment the counter). It should be noted that simultaneously, method 400 is also executing step 480. In other words, if a piece of data read from the shared buffer is actually delivered to the processing source, i.e., the piece of data has exited the memory core, then method 400 will also update the counter in step 470 (e.g., decrement the counter).

In step 450, method 400 readjusts the buffer address of the shared buffer. More specifically, the buffer address is adjusted in accordance with the value stored in the counter. Namely, the counter is tracking the number of pieces of data that were read from the shared buffer, but were not actually delivered to the processing source.

In step 460, method 400 clears or resets the pipeline stages holding the read data from the shared buffer, the matching pipeline holding the corresponding valid signal and the counter. Method 400 returns to step 410 to wait for the next destination ready signal.

It should be noted that although not specifically specified, one or more steps of method 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 4 that recite a determining operation or involve a decision, do not necessarily require that both branches of the determining operation be practiced. In other words, one of the branches of the determining operation can be deemed as an optional step.

It should be noted that the logic module 300 of FIG. 3 is suitable for use in performing some or all of the functions described herein. Furthermore, it should be noted that embodiments of the present invention can be implemented in software and/or in a combination of software and hardware, e.g., using application specific integrated circuits (ASIC), a general purpose computer or any other hardware equivalents such as microprocessors. In one embodiment, the present module or process for providing speculative read accesses can be loaded into memory and executed by processor to implement the functions as discussed above. As such, the present module or process for providing speculative read accesses (including associated data structures) of embodiments of the present invention can be stored on a computer readable medium or carrier, e.g., RAM memory, magnetic or optical drive or diskette and the like.

Furthermore, in one embodiment, one or more aspects of the present invention relate generally to a programmable logic device (PLD). A programmable logic device (PLD) is a general-purpose device that can be programmed by a user to implement a variety of selected functions. One type of PLD is a Field Programmable Gate Array (FPGA), which typically includes an array of configurable logic blocks (CLBs) and a plurality of input/output blocks (IOBs). The CLBs are individually programmable and can be configured to perform a variety of logic functions on a few input signals. The IOBs can be configured to drive output signals from the CLBs to external pins of the FPGA and/or to receive input signals from the external FPGA pins. The FPGA also includes a programmable interconnect structure that can be programmed to selectively route signals among the various CLBs and IOBs to produce more complex functions of many input signals. The CLBs, IOBs, and the programmable interconnect structure are programmed by loading configuration data into associated memory cells that control various switches and multiplexers within the CLBs, IOBs, and the interconnect structure to implement logic and routing functions specified by the configuration data to implement a user design in the FPGA. An FPGA may also include other programmable and non-programmable resources.

In one embodiment, one or more logic modules as shown in FIG. 2 and FIG. 3 can be implemented on a PLD. For example, the processor 210, co-processors 230*a-b*, and the memory core 220 (comprising the logic module 300) can be implemented on a PLD.

Furthermore, in one embodiment, one or more aspects of the present invention relate generally to an integrated circuit having a programmable portion. For example, the integrated circuit may comprise a processor with a programmable portion. As such, one or more modules of the network device as shown in FIG. 2 and FIG. 3 can be implemented on the integrated circuit having a programmable portion. For example, the co-processors 230*a-b*, and the memory core 220 (comprising the logic module 300) can be implemented on a programmable portion of the integrated circuit.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

What is claimed is:

1. A device, comprising:
a memory core having a shared buffer;
an arbitration module for receiving a destination ready signal from a processing source of a plurality of processing sources;
a first pipeline stage for storing at least one piece of data read from said shared buffer;
a second pipeline stage, different from said first pipeline stage, for storing at least one valid signal that causes said at least one piece of data to be read from said shared buffer and passed to said first pipeline stage; and
a counter for storing a value, wherein said value represents a number of pieces of data read from said shared buffer, but not delivered to said processing source,
wherein said value is determined in accordance with:
if one piece of data exits said shared buffer, but one piece of data does not exit said memory core, then said value is incremented;
if one piece of data exits said memory core, but one piece of data does not exit said shared buffer, then said value is decremented;
if one piece of data exits said memory core, and one piece of data exits said shared buffer, then said value remains the same; and
if no data moves from said memory core and said shared buffer, then said value remains the same.

2. The device of claim 1, wherein said device is deployed in a Media Oriented Systems Transport (MOST) device.

3. The device of claim 1, wherein said first pipeline stage comprises a plurality of registers.

4. The device of claim 3, wherein said plurality of registers comprises a plurality of shift registers.

5. The device of claim 1, further comprising:
an address generator, wherein said value in said counter is provided to said address generator to adjust a buffer address if said destination ready signal is de-asserted.

6. The device of claim 1, further comprising:
a signal generator for generating said source ready signal in response to said destination ready signal and one of said at least one valid signal.

7. The device of claim 1, wherein said core memory is coupled to at least one network interface for interfacing with another device in a network.

8. The device of claim 7, wherein said network is a ring network.

9. The device of claim 1, wherein said processing source performs at least one of: an encryption function, a decryption function, an encoding function, a decoding function, a transcoding function, a format conversion function, a filtering function, a masking function, a compression function, a decompression function, a noise-cancellation function, or an equalization function.

10. The device of claim 1, wherein said device is implemented on a programmable logic device (PLD).

11. The device of claim 1, wherein said device is implemented on a programmable portion of an integrated circuit.

12. A method for processing data stored in a core memory having a shared buffer, comprising:
receiving a destination ready signal by an arbitration module from a processing source of a plurality of processing sources;
determining if said processing source is allowed to access said shared buffer;
storing at least one piece of data read from said shared buffer into a first pipeline stage in response to said destination ready signal;
storing at least one valid signal that causes said at least one piece of data to be read from said shared buffer and passed to said first pipeline stage, wherein said at least one valid signal is stored into a second pipeline stage that is different from said first pipeline stage; and
storing a value into a counter, wherein said value represents a number of pieces of data read from said shared buffer, but not delivered to said processing source,
wherein said value is determined in accordance with:
if one piece of data exits said shared buffer, but one piece of data does not exit said memory core, then said value is incremented;
if one piece of data exits said memory core, but one piece of data does not exit said shared buffer, then said value is decremented;
if one piece of data exits said memory core, and one piece of data exits said shared buffer, then said value remains the same; and
if no data moves from said memory core and said shared buffer, then said value remains the same.

13. The method of claim 12, wherein said core memory is deployed in a Media Oriented Systems Transport (MOST) device.

14. The method of claim 12, wherein said first pipeline stage comprises a plurality of registers.

15. The method of claim 12, further comprising:
providing said value in said counter to an address generator to adjust a buffer address if said destination ready signal is de-asserted.

16. The method of claim 12, further comprising:
generating said source ready signal in response to said destination ready signal and one of said at least one valid signal.

17. The method of claim 12, wherein said core memory is coupled to at least one network interface for interfacing with another device in a network.

18. The method of claim 12, wherein said core memory is implemented on a programmable logic device (PLD), or on a programmable portion of an integrated circuit.

* * * * *